Jan. 24, 1939.     H. ERICKSON     2,144,917
MACHINE FOR APPLYING INDEX TABS TO BOOKS
Filed Feb. 26, 1938     9 Sheets-Sheet 5
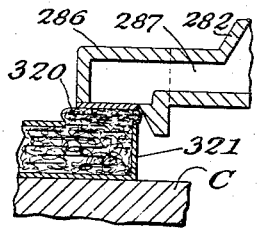
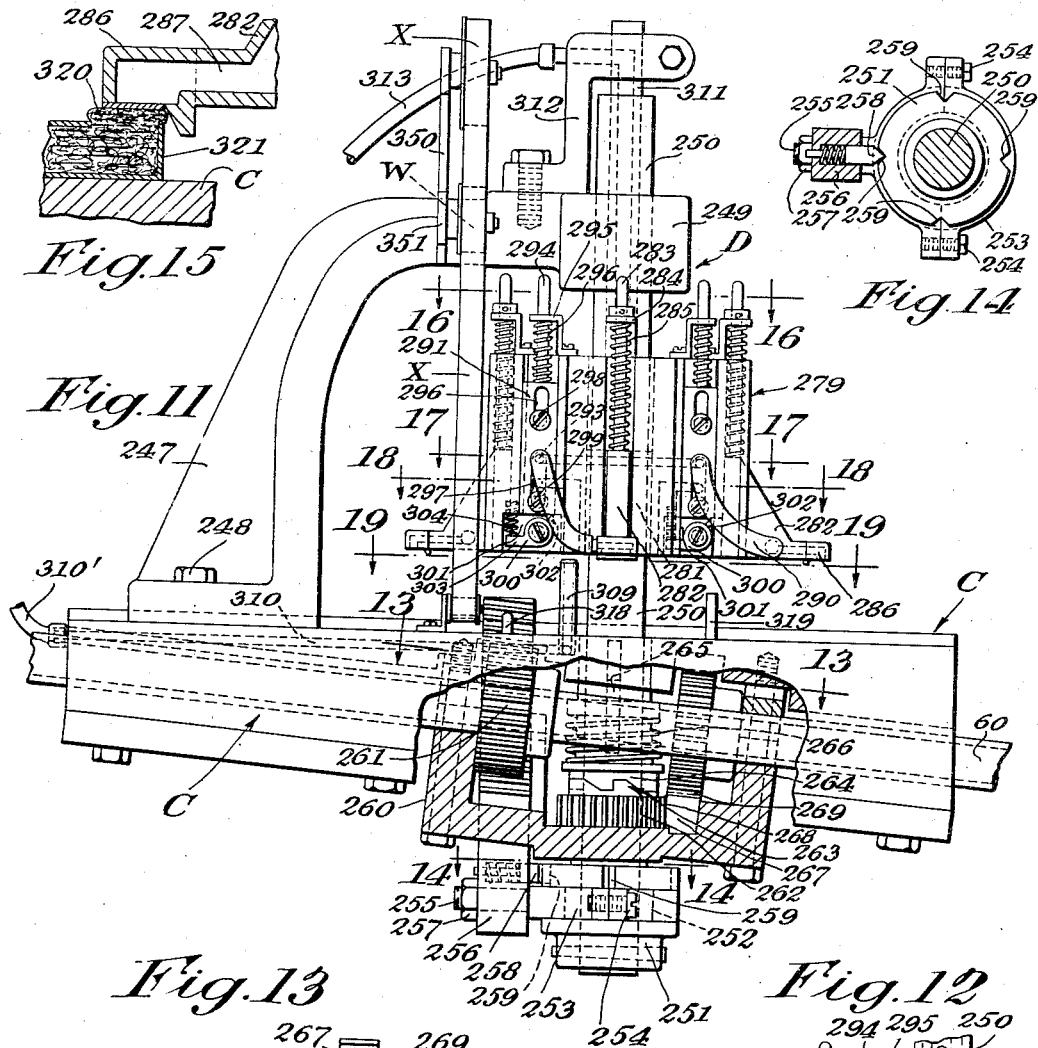
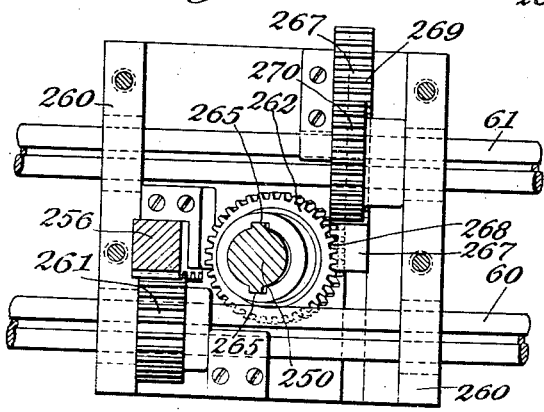
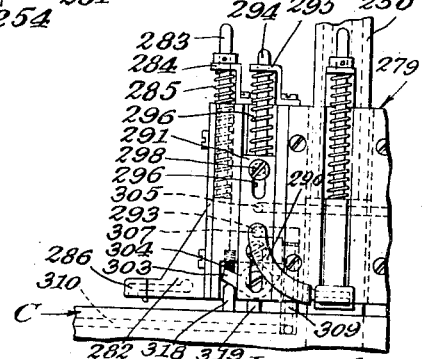
Inventor:
Hjalmar Erickson
By Dike, Calver + Gray
Attorneys.

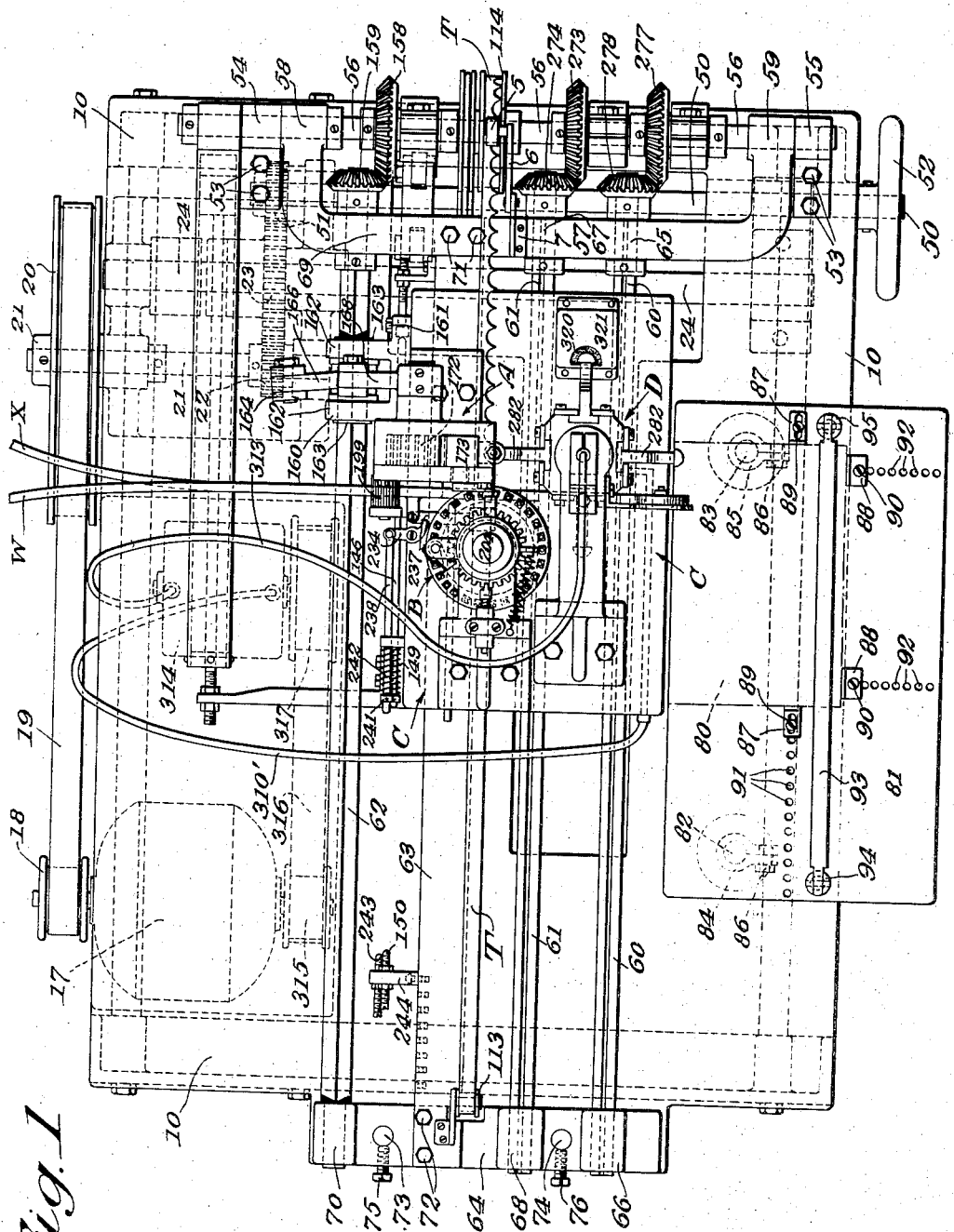

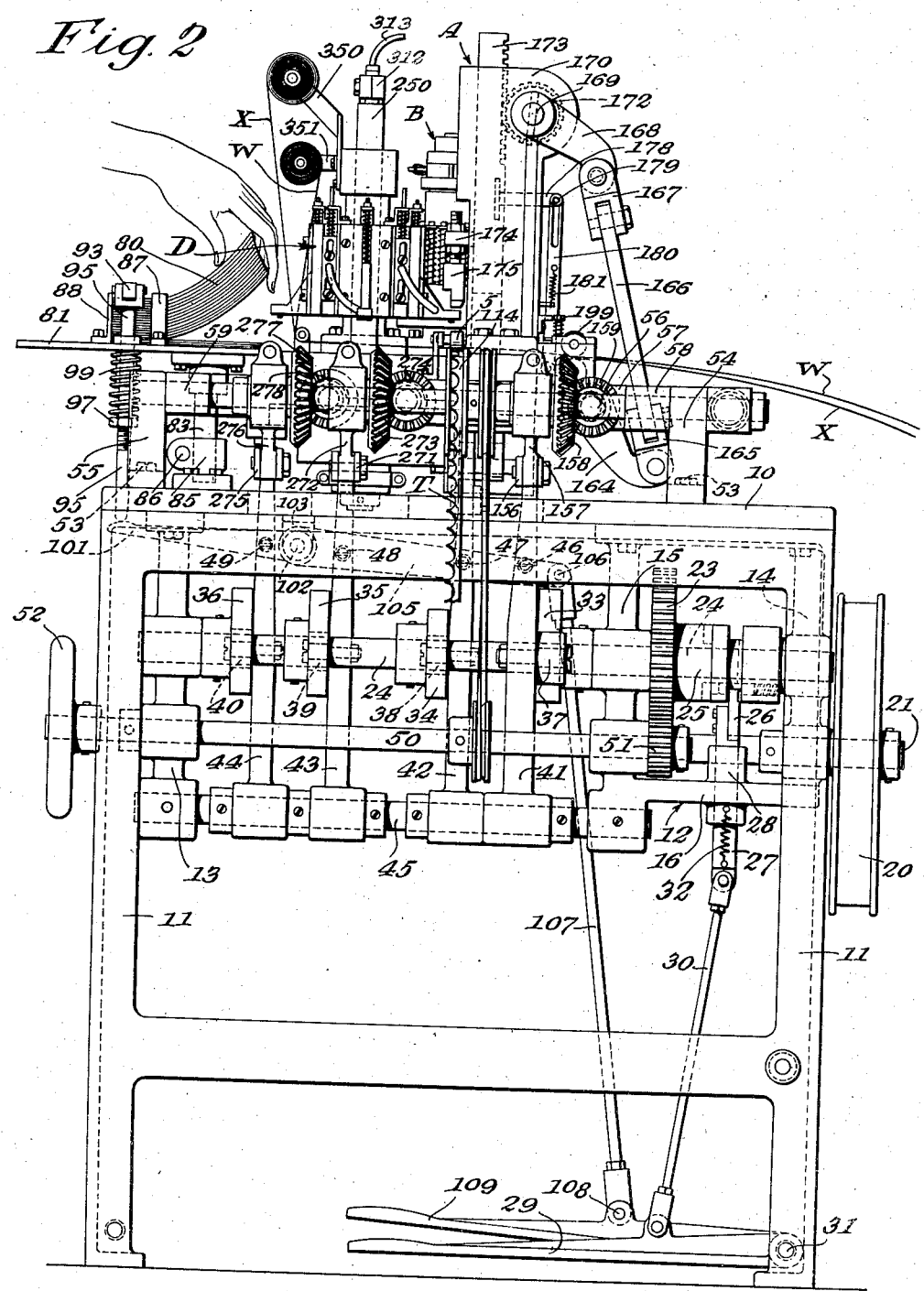

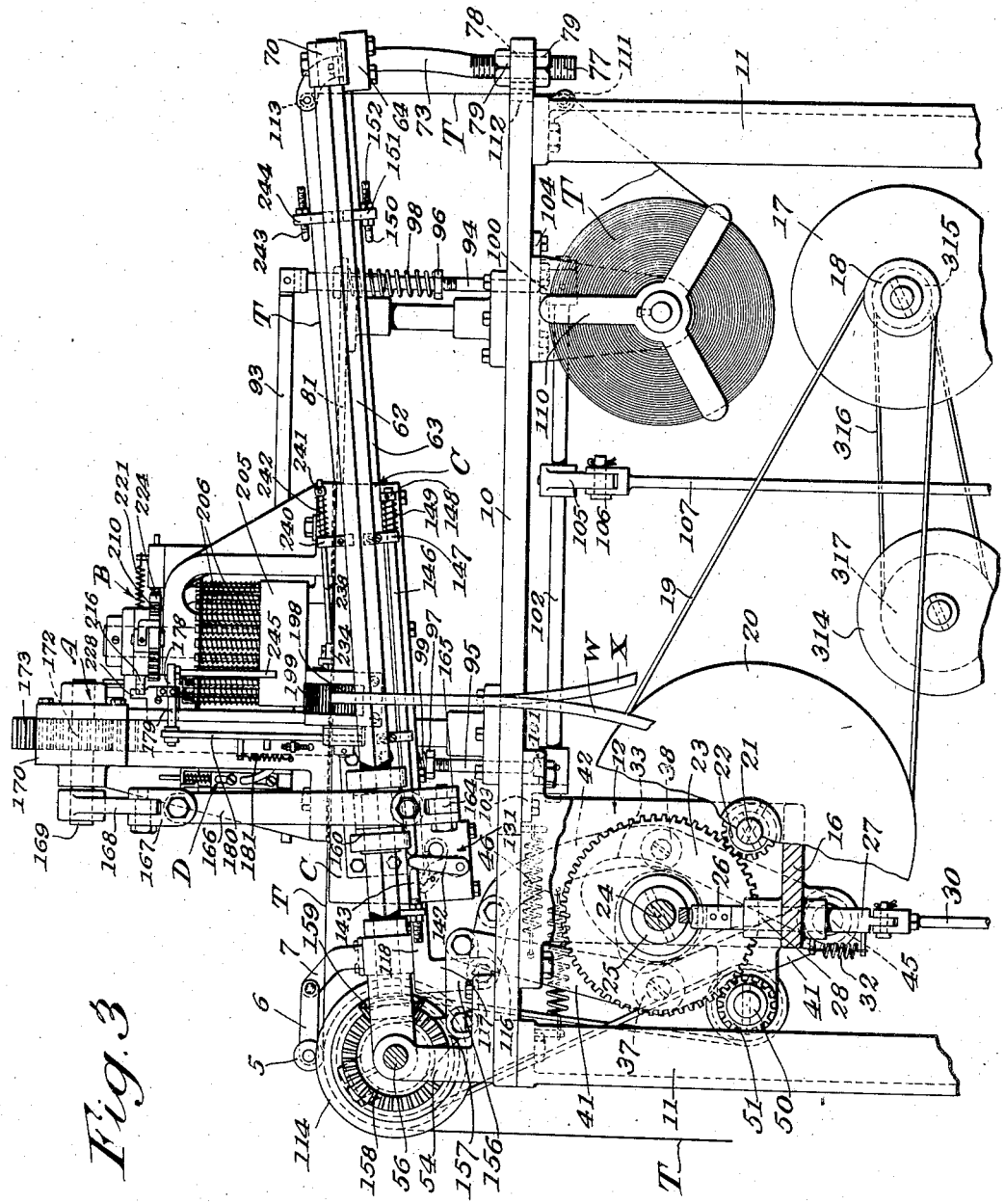

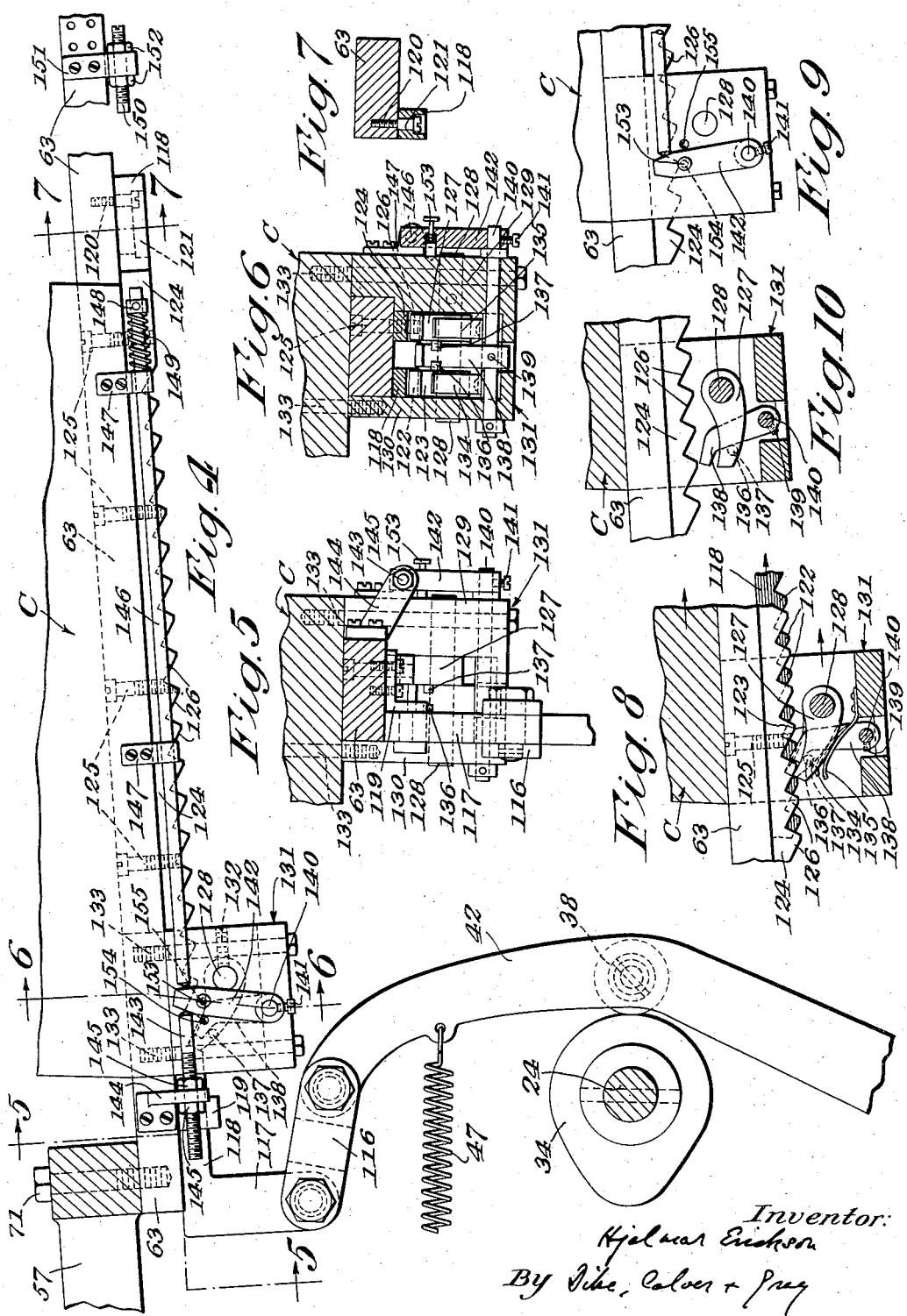

Jan. 24, 1939. H. ERICKSON 2,144,917
MACHINE FOR APPLYING INDEX TABS TO BOOKS
Filed Feb. 26, 1938 9 Sheets-Sheet 6

Inventor
Hjalmar Erickson
By Dike, Calver & Gray
Attorneys.

Jan. 24, 1939.   H. ERICKSON   2,144,917
MACHINE FOR APPLYING INDEX TABS TO BOOKS
Filed Feb. 26, 1938   9 Sheets-Sheet 7
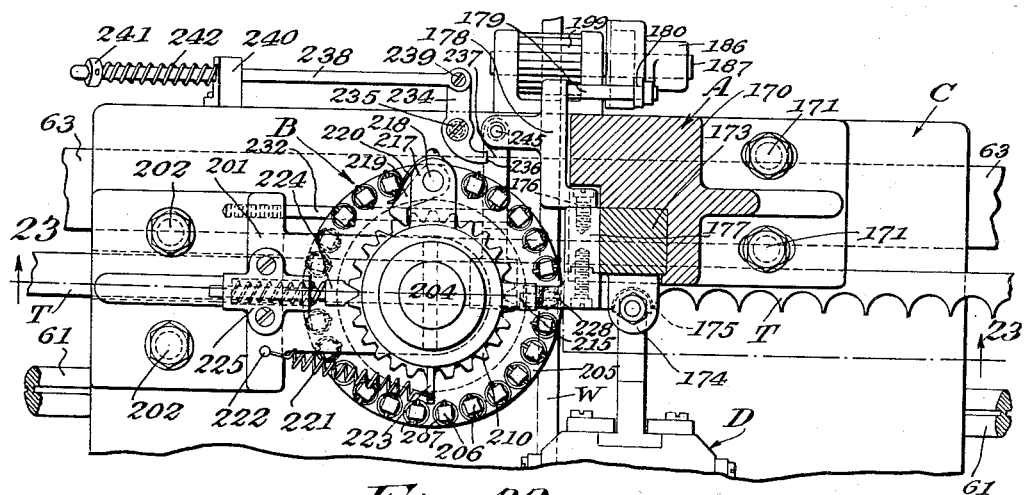
Fig. 22
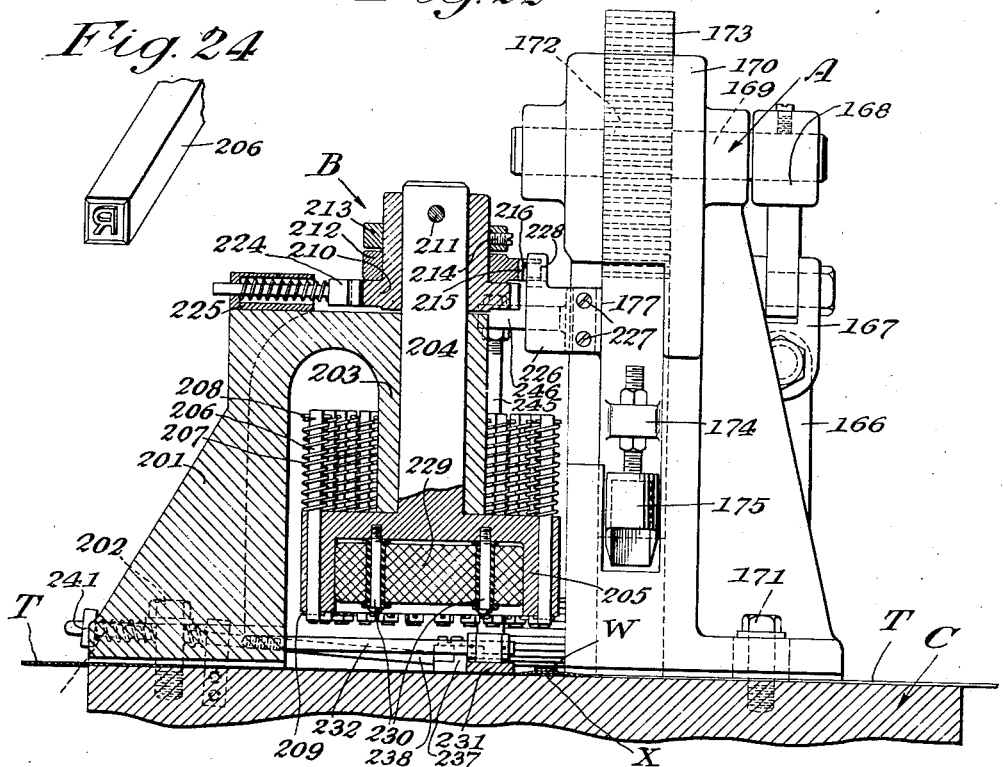
Fig. 24
Fig. 23
Inventor:
Hjalmar Erickson
By Dike, Calver + Gray
Attorneys.

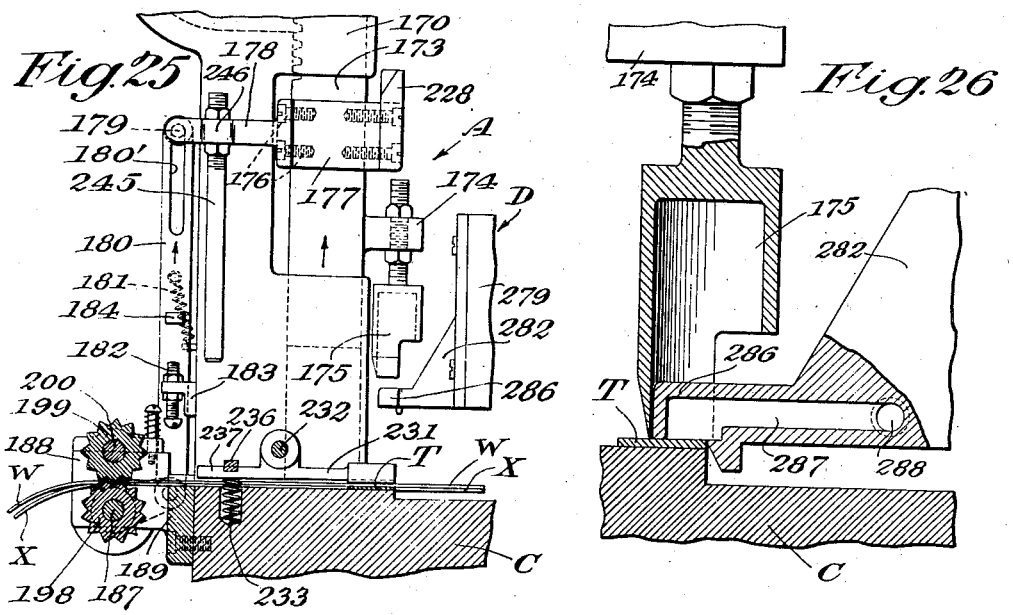
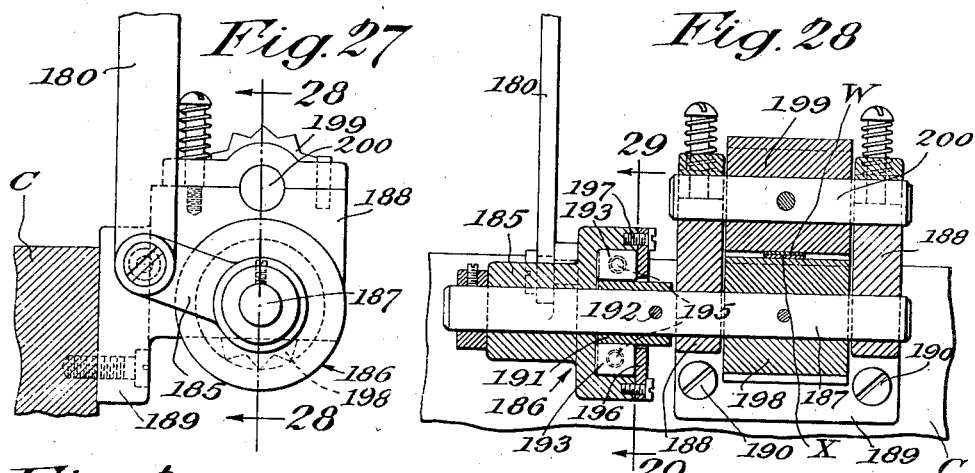
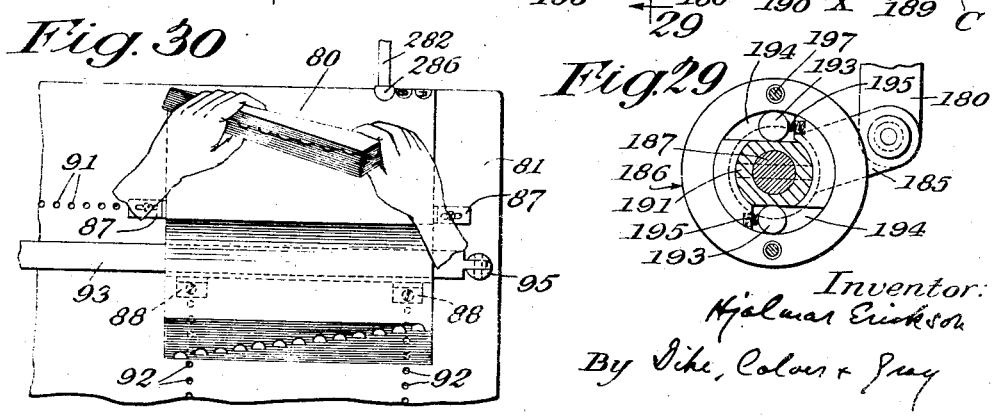

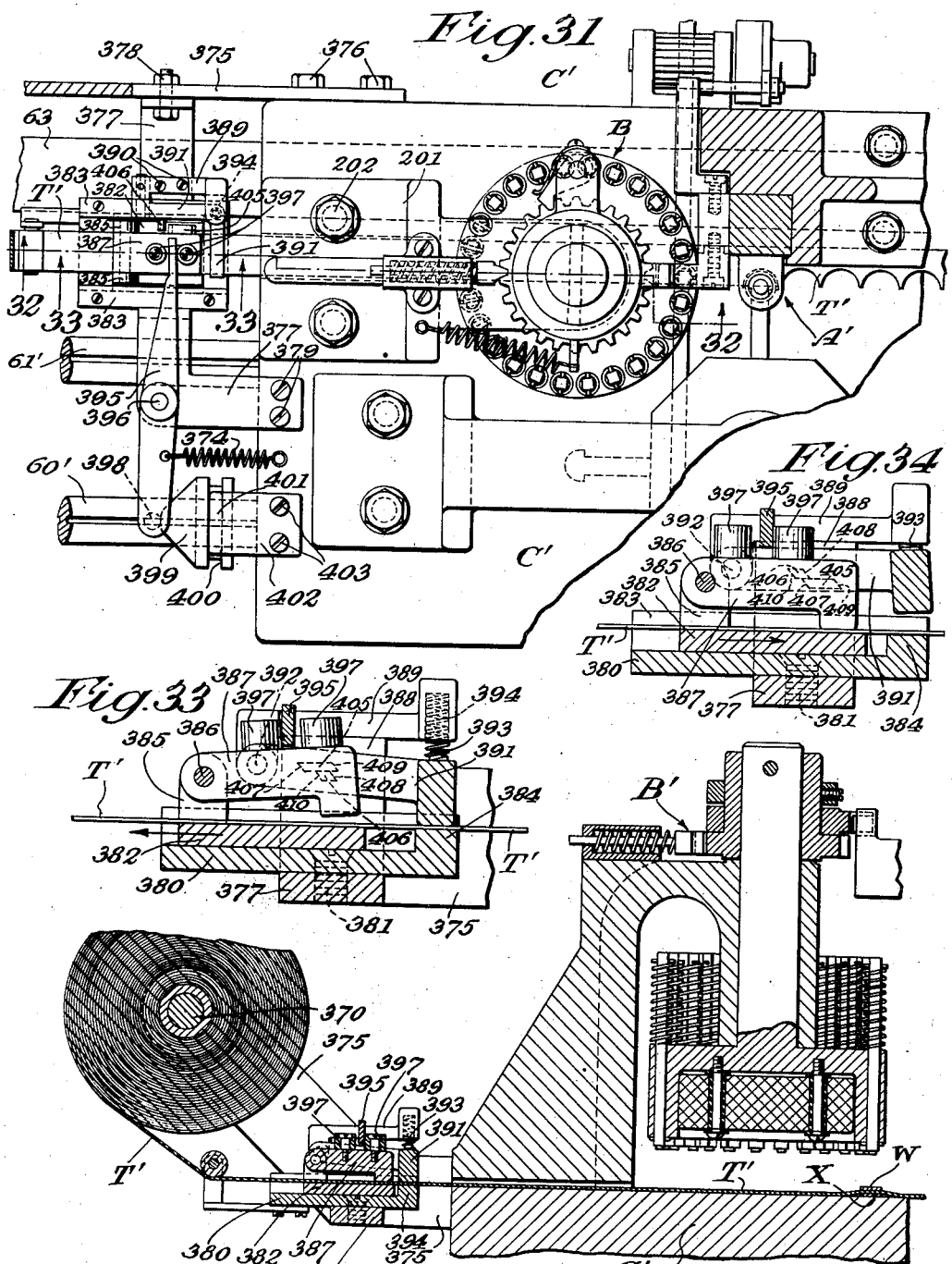

Patented Jan. 24, 1939

2,144,917

UNITED STATES PATENT OFFICE 2,144,917

MACHINE FOR APPLYING INDEX TABS TO BOOKS

Hjalmar Erickson, Cambridge, Mass.

Application February 26, 1938, Serial No. 192,803

9 Claims. (Cl. 216—2)

The present invention relates generally to book indexing machines and more particularly to a mechanism whereby indexing tabs are automatically made, printed and applied to a book, at the edge of which suitable notches have been previously cut either by hand or with the aid of a machine similar to that described in my Patent No. 2,078,656, dated April 27, 1937.

In the manufacture of indexed books and more particularly of dictionaries it is customary to cut out notches at the edge of each group of pages covering each letter of the alphabet and then paste a tab of distinctive color, having printed on it the corresponding letter, on one of the pages of each group, in such a way as to permit each tab to register with the notch formed in the group of pages directly in front of it; thus allowing the user to see all the tabs and consequently their corresponding letters at a glance. Heretofore, these operations have been manually executed, but such methods have become obsolete and impractical owing to the necessity of quantity production in articles of this nature.

It is, therefore, one of the important objects of this invention to provide a book indexing machine simple in construction, which can be manufactured at a relatively low cost and which can be operated by unskilled persons, yet which will perform the book indexing operation accurately and at a greatly increased rate.

Another object of the invention is to provide a machine of the above-mentioned type by means of which tabs of a desired shape are printed and cut from a strip of suitable material and are rendered adhesive on one surface and applied to the page selected by the operator.

A further object of the invention is to provide a novel mechanism in which the combination, construction and arrangement of parts enables the machine to be applicable to the manufacture of books of different sizes.

The foregoing and other more particular objects of the invention, together with means whereby the latter may be carried into effect, will best be understood from the following description of a preferred embodiment thereof illustrated in the accompanying drawings. It will be understood, however, that the particular construction described and shown has been chosen for purposes of exemplification merely, and that the invention, as defined by the claims hereunto appended, may be otherwise embodied without departure from the spirit and scope thereof.

In the drawings:

Fig. 1 is a top plan view of the machine.

Fig. 2 is a side elevation of the machine as seen from the right side of Fig. 1.

Fig. 3 is a rear elevation of the machine.

Fig. 4 is a detail elevation partly broken away of the carriage driving mechanism viewed from the rear.

Figs. 5, 6 and 7 are sectional views on lines 5—5, 6—6 and 7—7, respectively, of Fig. 4.

Fig. 8 is a vertical section partly in elevation of a portion of the carriage and its driving mechanism when in operation.

Fig. 9 is an elevation of a portion of the carriage and its release mechanism.

Fig. 10 is a vertical section showing the carriage in released position from its driving mechanism.

Fig. 11 is a detail elevational view partly in section of the tab carrier head and its operating mechanism.

Fig. 12 is a partial elevational view of the tab carrier head.

Fig. 13 is a horizontal section taken substantially on line 13—13, Fig. 11.

Fig. 14 is a horizontal section taken on line 14—14, Fig. 11.

Fig. 15 is an enlarged sectional view of a portion of the carrier head in contact with a moistening device.

Figure 16:
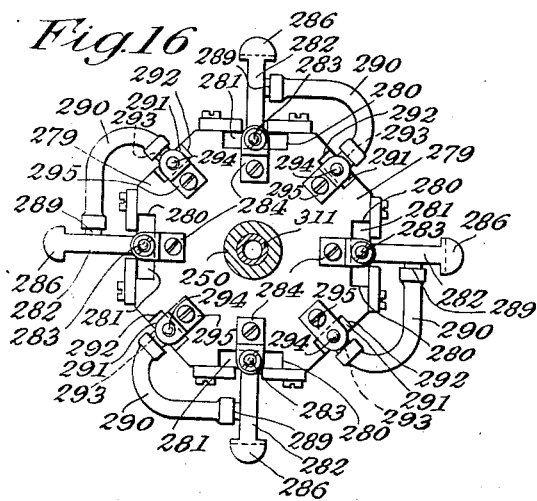
Figure 17:
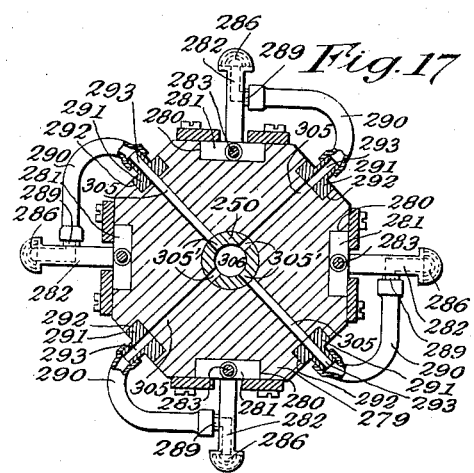
Figure 18:
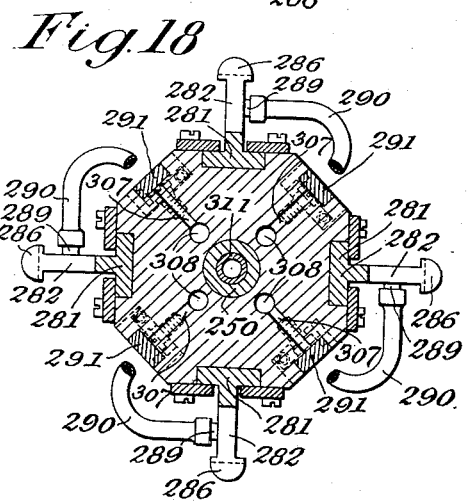

Figs. 16, 17 and 18 are horizontal sections taken on lines 16—16, 17—17 and 18—18, respectively, Fig. 11.

Figure 19:
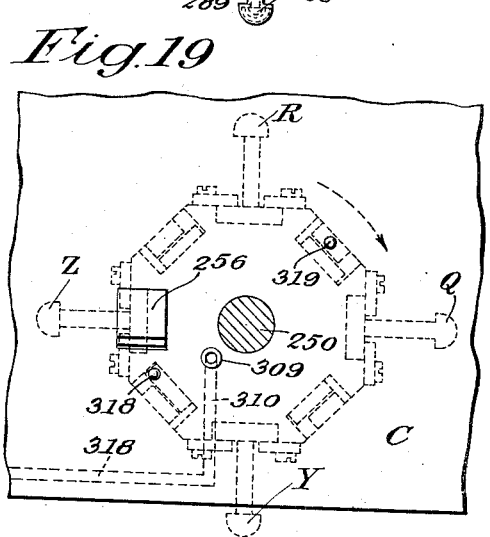

Fig. 19 is a diagrammatic view substantially on line 19—19, Fig. 11.

Figure 20:
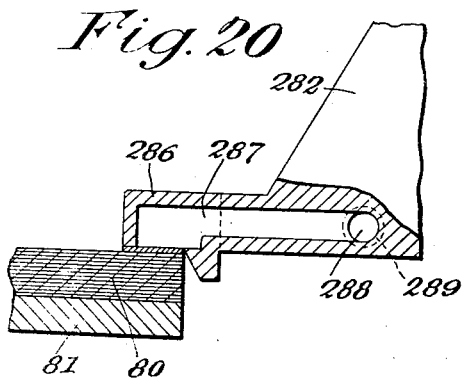

Fig. 20 is an enlarged sectional view of a portion of the carrier head in contact with the book.

Figure 21:
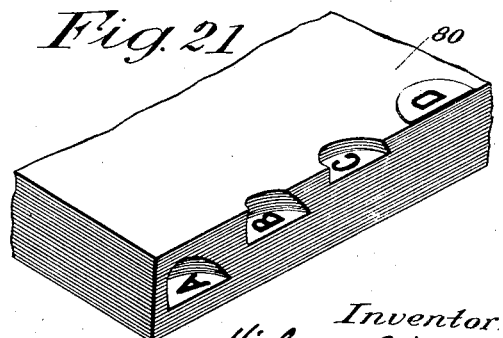

Fig. 21 is a fragmentary perspective view of a book indexed by the machine.

Fig. 22 is a top plan view of the printing head and tape feeding mechanism of the machine.

Fig. 23 is a vertical section substantially on line 23—23 of Fig. 22.

Fig. 24 is a detail perspective view of one of the type bars, partly broken away.

Fig. 25 is an elevational detail view showing the tape feed and cutting mechanisms.

Fig. 26 is an enlarged sectional view showing the tab cutting operation.

Fig. 27 is a side view of part of the feed mechanism of two of the tapes.

Fig. 28 is a longitudinal section taken on line 28—28, Fig. 27.

Fig. 29 is a vertical section on line 29—29, Fig. 28.

Fig. 30 is a top plan view of the work table, illustrating the way in which the operator holds the pages of the book to be indexed.

Fig. 31 is a plan view similar to Fig. 22 of a modified construction.

Fig. 32 is a sectional view taken upon the line 32—32 of Fig. 31.

Figs. 33 and 34 are sectional views taken upon the line 33—33 of Fig. 31 showing the parts in different positions.

In general, the machine of the invention comprises a stationary table 81 for supporting a book to which index tabs are to be applied. The table is positioned adjacent the path of movement of a carriage C, which in the embodiment illustrated is moved step by step along an inclined support to bring a tab applying mechanism adjacent the desired portion of the book for applying a tab. The carriage C supports mechanism for applying or printing a symbol or character upon a tape. It also supports cutting mechanism for cutting a tab from the printed portion of the tape. A tab carrier D is rotatably supported upon the carriage and is rotated step by step a portion of a revolution into the tab cutting location or station, a location where the tab is rendered adhesive and finally into the location or station where the tab is applied to the book.

The bed or plate 10, its legs or standards 11 and the hangers 12 and 13 constitute the framework of the machine. Hanger 12 is formed by two bearing walls 14 and 15 and a bottom horizontal wall 16.

A motor 17 (see Figs. 1 and 3) located at any convenient place under the table of the machine has keyed to one end of its shaft a pulley 18, and through this pulley and a belt 19 drives another pulley 20 rigidly secured to a short shaft 21 which is mounted for rotation between bearing walls 14 and 15 of hanger 12.

A pinion 22 keyed to shaft 21 meshes with a gear 23 idly mounted on a cam shaft 24 which is journalled in bearing portions provided by hangers 12 and 13. Gear 23, however, is adapted to rotate said cam shaft through a clutch 25. To this effect, gear 23 is secured to or forms part of one element of the clutch, while the other element is rigidly secured to cam shaft 24. Thus, it will be seen, that when motor 17 is in operation and clutch 25 is out of engagement, gear 23 will rotate idly, but when the clutch is brought into action, cam shaft 24 will also begin to rotate and will remain active as long as the clutch is in engaging position.

Clutch 25 is of the so-called one revolution type and of standard construction, therefore, a detailed description of its structure is deemed unnecessary, except to say that a wedge shaped member 26 designed to throw the clutch in and out of operation is secured to a rod 27 slidably mounted on a bearing 28 forming part of the bottom wall 16 of hanger 12, said rod 27 being connected to a foot treadle 29 through a link 30. Foot treadle 29 is pivoted at 31 to any convenient part of the frame of the machine, and one end of a coil spring 32 is attached to rod 27 while its other end is secured to hanger 12. Spring 32 is normally forcing wedge 26 in engagement with certain elements of clutch 25 thus keeping it out of operation. But if foot treadle 29 is stepped on, wedge 26 is thrown out of engagement allowing both elements of the clutch to lock together, and gear 23 will start to drive cam shaft 24.

Thus it will be noted that as long as the operator keeps a constant pressure on foot treadle 29, clutch 25 will be released and the machine will be in constant action. If, however, the operator merely steps momentarily on the treadle, wedge member 26 will immediately be forced back by the action of spring 32 and be ready to disengage the clutch at the end of one revolution, which is required for the simultaneous operations of printing, cutting, moistening and application of the tabs of the machine, as well as the step by step driving mechanism for the carriage on which the different instrumentalities performing the aforesaid operations are mounted; all of which will be fully described hereinafter.

Rigidly secured to cam shaft 24 and adapted to rotate with it (see Fig. 2), there are four cams 33, 34, 35 and 36, which are conveniently shaped and designed to engage respectively friction rollers 37, 38, 39 and 40 pivotally attached to corresponding cam levers 41, 42, 43 and 44 and these four levers are mounted to rotate freely on a shaft 45 secured in bearing portions formed in the lower part of hangers 12 and 13. Springs 46, 47, 48 and 49 have one end attached to the frame of the machine and the other end secured to the corresponding cam levers 41, 42, 43 and 44. From this arrangement it will be easily seen that due to the opposing forces provided by the cams and the springs, levers 41, 42, 43 and 44 are given a reciprocatory movement when the machine is in operation.

For adjusting purposes, a shaft 50 is provided between hangers 12 and 13, and has secured to one of its ends a pinion 51 in mesh with gear 23. A hand wheel 52 rigidly attached to the other end of the shaft serves to operate the machine when it is so desired.

Briefly, cam lever 41 serves to operate the tab cutting and tape feeding mechanism generally indicated at A and printing mechanism B. Cam lever 42 operates the driving mechanism for the carriage indicated at C. Lever 43 operates mechanism for the rotation of tab carrier or picker head D, while lever 44 actuates mechanism for the vertical movement of said carrier head. These mechanisms will be described fully hereinafter.

Referring to Figs. 1, 2 and 3, fastened to the top of bed plate 10 as by screws 53, there are two bearings 54 and 55 between which a shaft 56 is mounted. A U-shaped bracket 57 having end portions 58 and 59 is pivotally mounted on shaft 56. The bracket 57 provides bearings 65, 67 and 69 for one end of spline shafts 60 and 61 and a square shaft 62, respectively. The opposite ends of spline shafts 60 and 61 and square shaft 62 are journalled in bearings 66, 68 and 70, respectively, provided in a cross member 64 which is adjustable vertically. Slide bar 63 on which carriage C travels is rigidly fastened to U-bracket 57 by screws 71 and to cross member 64 by screws 72.

To make cross member 64 vertically adjustable two rods 73 and 74 are secured to cross member 64 by set screws 75 and 76, respectively. Rods 73 and 74, as is more clearly shown in Fig. 3, have threaded ends 77 passing through a hole 78 in bed plate 10, said ends being secured to the bed plate by means of nuts 79.

From the arrangement of these parts, it will be seen that an inclined frame is provided on which carriage C travels, and that said frame as a whole is pivoted on shaft 56. It will also be noticed that the inclination of said frame may be varied by simply adjusting rods 73 and 74 for height.

The inclination of this frame serves to raise the carriage gradually as it advances step by step along the edge of the book 80, which is clamped on a stationary horizontal table 81, thus raising the carriage as it advances step by step. This brings the carriage to positions corresponding to the different heights at which the tabs have to be applied, due to different thickness of the sections of the book.

Work table 81 is rigidly mounted on rods 82 and 83 and these rods are secured in sockets 84 and 85 conveniently fixed to bed plate 10, by means of set screws 86, which permit adjusting of the table. For the proper positioning of book 80, two sets of guide plates 87—87 and 88—88 are employed, which may be secured to the table by screws 89—89 and 90—90. Series of holes 91 and 92 are provided in the table, to which guide plates 87—87 and 88—88 can be attached. This arrangement is provided to take care of different sizes of books.

A clamping bar 93 extends along table 81 and serves to hold the book firmly while the tabbing operation is in progress, but in a way as to allow the operator the free selection of the pages.

Both ends of clamp bar 93 are secured to vertical rods 94 and 95 extending through suitable holes in work table 81 and bed plate 10 of the frame of the machine. Collars 96 and 97 (see particularly Figs. 2 and 3) are secured to rods 94 and 95. Springs 98 and 99 surround rods 94 and 95 and exert pressure between work table 81 and collars 96 and 97 to force clamp bar 93 in a downward direction, or towards clamping position.

The lower ends of rods 94 and 95 are rounded and rest respectively on the end portions of arms or levers 100 and 101 which are secured near opposite ends of a longitudinal shaft 102 journalled in bearings 103 and 104 secured to the underside of bed plate 10. Another rearwardly extending arm or lever 105 is attached to shaft 102 and its free end is pivotally connected at 106 to one end of a vertical link 107, the other end of which is pivoted at 108 to a foot treadle 109 pivoted at 31 to the frame of the machine. Thus, it will be seen, that to place a book in position the operator may step on treadle 109 which causes clamp bar 93 to raise so that a book may be placed between the same and table 81 and in engagement with guide plates 87—87 and 88—88. When the treadle is released, springs 98 and 99 force bar 93 downward to clamp the book.

A roll of gummed tape T of any suitable material and distinctive color is freely carried by a magazine or support 110 (see Fig. 3) suitably secured to the underside of bed plate 10. The tape T, from which the tabs are cut, after passing over guide roll 111 and through an opening 112 formed in bed plate 10 continues upwardly and after passing over a second guide roll 113 mounted on cross member 64 passes over the carriage C and under the printing and cutting heads A and B. The tape passes out of the machine over pulley 114 fixed upon shaft 56. The tape is urged in engagement with the pulley 114 by a roll 5 carried at one end of an arm 6 the other end of which is pivotally mounted upon a bracket 7 fixed upon the bracket 57. The feeding mechanism for tape T will be fully described hereinafter.

A pair of tapes W and X form part of the printing mechanism B. The tape W may be formed from gold leaf and the tape X is arranged to serve as a cushion for the tapes W and T during the printing operation. A supply of the tapes W and X is mounted in the form of rolls upon brackets 350 and 351, respectively, upon the carriage C and are fed step by step, respectively, over and beneath the tape T at a location beneath the printing head B by mechanism described hereinafter.

I shall now describe the step by step driving mechanism for carriage C which is clearly illustrated in Figs. 2 to 9 inclusive. Cam lever 42 which, as explained before, is adapted to receive a reciprocatory movement produced by the action of cam 34 and spring 47, is pivotally connected at its upper end with a link 116, the other end of which is also pivoted to a downwardly projecting end 117 of a rack 118 located under slide bar 63 and adapted to move longitudinally at each stroke of cam lever 42. A U-shaped bracket 119 secured to or forming part of slide bar 63 serves as one support for rack 118 at one of its ends, while at its other end a screw 120 also secured to rack 63 and passing through slot 121 serves as the other support. Rack 118 is provided with teeth 122 designed to engage a pawl 123.

A second rack 124 in parallel relation with rack 118 is rigidly secured to the slide bar 63 by screws 125 and has teeth 126 adapted to engage a pawl 127. Both pawls 123 and 127 are loosely mounted on a short shaft 128 secured between side walls 129 and 130 of a block 131 which is held stationary by a set screw 132. Block 131 is attached to carriage C by screws 133. Leaf springs 134 and 135 each having one end secured to the bottom wall of block 131 bear against pawls 123 and 127, respectively, and keep said pawls in constant engagement with their corresponding racks 118 and 124. Pins 136 and 137 projecting laterally from the sides of pawls 123 and 127 are adapted to cooperate with a third pawl 138 rigidly mounted at 139 to another short shaft 140 which rotates between the lower portion of side walls 129 and 130 of block 131. Outside of block 131 and rigidly secured to shaft 140 by a set screw 141 there is an arm 142 projecting upwardly and designed to be moved in one or an opposite direction by a trip mechanism.

The trip mechanism comprises a threaded rod 143 attached to a bracket 144 rigidly secured to the left side of slide bar 63 (see particularly Figs. 3 and 4) said rod being adjustable by means of nuts 145. A second rod 146 is slidably mounted on brackets 147—147 secured to carriage C, thus moving along with it and has attached to one of its ends a collar 148. A spring 149 is located between collar 148 and one of the brackets 147, which normally keeps rod 146 out of engagement with arm 142. A pin 150 is adjustably secured to a bracket 151 by nuts 152, the bracket 151 being fixed upon slide bar 63. Rods 143 and 146 as well as pin 150 are in alignment with each other and are designed to rock arm 142 either to the left, or to the right, at predetermined moments. A spring pressed plunger 153 is located at the upper end of arm 142 to engage either of conical depressions 154 and 155 on the outside of wall 129 of block 131 in order to hold bar 142 in either of two predetermined positions.

From the arrangement as herein described, it will be seen that when the parts are in the position illustrated in Fig. 8 and rack 118 is moved to the right by the action of cam 34, block 131 and, consequently, carriage C, are forced to move in the same direction due to the engagement of pawl 123 with one of the teeth of rack 118. At this time, arm 142 is in the position shown in Fig. 4, and pawl 138, which is rigidly connected to shaft 140 and naturally moves only when arm 142 is operated, is kept out of action by the engagement of plunger 153 with depression 155, thus keeping arm 142 in that position. This allows leaf springs 134 and 135 to yieldingly hold pawls 123 and 127 in constant engagement with the teeth of their respective racks 118 and 124.

As carriage C advances, pawl 127 also advances dragging over the edge of one of the teeth in stationary rack 124 until it reaches the next notch formed by said teeth and is forced in this notch by leaf spring 135. At this time rack 118 has reached the maximum movement produced by cam 34 through lever 42 and starts to move back by the action of spring 47. But since pawl 127 prevents the carriage from moving, the tooth of rack 118 engaging pawl 123 will force this pawl out of engagement with the rack 118 against the action of spring 134 until the pawl reaches the next notch and is forced in said notch by said spring. This happens at the end of the back stroke of lever 42, at which time the parts are again in position for the operation to be repeated. Thus, the step by step movement of the carriage is obtained until it reaches the last notch of rack 124. When the mechanism already described forces the carriage to advance another step, rod 146 abuts against pin 150 and is urged to move backwards against the pressure of spring 149. In doing this, rod 146 engages arm 142 and forces spring pressed plunger 153 out of register with depression 155 and moves the arm to the left of Fig. 4 until plunger 153 reaches depression 154, which locks arm 142 in the position shown in Fig. 9.

Since pawl 138 moves with arm 142, the movement of this arm, as explained, will cause the pawl to engage lateral pins 136 and 137 projecting from pawls 123 and 127, respectively, and force both pawls out of engagement with racks 118 and 124 (see Fig. 10) thus setting the carriage free to be moved in either direction.

The carriage then moves down its inclined support toward the left of Fig. 4 to its starting position, and in doing this the rod 146 is moved away from pin 150. Spring 149, which up to this time has been under pressure, will then force rod 146 to move out of contact with arm 142 a distance sufficient to allow the movement of said arm to the right when abutting against rod 143 and until the plunger 153 carried by arm 142 engages depression 155, which, as it will be clearly seen, will move pawl 138 out of action, thus allowing pawls 123 and 127 to be thrown in engagement with racks 118 and 124 as previously described.

It is opportune to say at this time that each advancing step of the carriage corresponds with each operation of the different mechanisms to print, cut, moisten and apply a tab to the book and that all these operations take place during one revolution of cam shaft 24, or, every time the operator steps on foot treadle 29.

The operation of the tab cutting and printing tape feeding mechanism A is as follows:

Cam lever 41 (see Figs. 1, 2 and 3) carries a friction roll 37 which engages a cam 33 rigidly secured to shaft 24. The cam 33 is adapted to move cam lever 41 in one direction while a spring 46 moves the lever in the opposite direction. One end of a link 156 is pivotally connected to upper end of lever 41 while its other end is pivotally connected to a crank lever 157 rigidly secured to the hub of a gear 158 freely mounted on shaft 56 and meshing with a pinion 159 keyed to square shaft 62.

A U-shaped bracket 160, rigidly secured to carriage C as at 161, is provided with two outwardly projecting members 162—162 carrying bearings 163—163 which rotatably support square shaft 62 while permitting bracket 160 to slide along the length of the shaft. Crank lever 164 is slidably mounted on square shaft 62 so as to rotate with it between projecting members 162—162 of bracket 160. Thus, it will be seen that through this arrangement, crank lever 164 will be able to travel with carriage C at the same time it may be moved up or down by the rotation of square shaft 62 when operated by cam lever 41 through gear 158 and pinion 159.

Crank lever 164 is connected through a series of links 165, 166 and 167 to an arm 168 rigidly secured to a short shaft 169 mounted in suitable bearings provided at the top of a housing 170, which is fastened to carriage C by screws 171—171. The shaft 169 carries a pinion 172 engaging a rack 173 slidably mounted in guideways provided in housing 170. An up and down movement is transmitted to the rack 173 by pinion 172 and the mechanism already described. A laterally extending member 174 projecting through an opening in housing 170 forms a part of, or is fastened to one side of rack 173. A cutting tool 175 is adjustably mounted on member 174 and is movable into engagement with the tape T to cut a tab therefrom (see particularly Figs. 22, 23 and 25). A member 177 projects from the rack 173 at right angles to member 174 through an opening in the other side of the housing 170. A bracket 178 is secured by screws 176 to the member 177 and carries a rod 179 which engages a slot 180' in a vertically disposed lever 180. A spring 181 fastened to housing 170 and lever 180 constantly forces lever 180 in a downward direction, and an adjustable screw 182 on a small bracket 183 secured to housing 170 serves to limit said movement by its engagement with a lug 184 projecting from said lever.

The lower end of lever 180 is pivotally connected to one member 185 of a one way clutch generally shown at 186, which forms part of the feeding mechanism for tapes W and X and is fully illustrated in Figs. 25 to 29, inclusive. Clutch member 185 is mounted for free rotation on a shaft 187 journalled in the bearing portions 188—188 of a U-shaped bracket 189, which is fastened to carriage C by screws 190. The inner member 191 of clutch 186 is secured to shaft 187 as at 192 and between said member and outside member 185 there are a pair of rollers 193 which are located in pockets 194 formed by cut out portions in inner member 191. Rollers 193 are forced against the surfaces of outer and inner members 185 and 191 by springs 195, and a cover plate 196 secured to outer member 185, as at 197, serves to keep the parts together and in proper relation to each other. This is a well known type of clutch and is employed to drive shaft 187 intermittently only in one direction.

Therefore, when rack 173 and, consequently, lever 180 move down, member 185 rotates in one direction but this movement is not imparted to shaft 187 which remains stationary. However, when rack 173 moves upwardly rod 179 moves with it and lever 180 follows the same movement, thus rotating clutch member 185, which in this case will, through the cooperation of rollers 193 and inner clutch member 191, rotate shaft 187.

Secured to shaft 187 and placed between arms 188—188 on bracket 189 there is a serrated wheel 198 cooperating with another serrated wheel 199 mounted on a shaft 200 in order to feed tapes W and X, which pass between the serrated wheels, a desired amount step by step, and in synchronism with the printing mechanism B.

The printing mechanism B is more clearly shown in Figs. 22, 23 and 24. It is formed by an inverted L-shaped bracket 201 secured to carriage C by screws 202 and having a vertically disposed bearing portion 203 in which the upwardly extending shaft 204 of a printing head 205 is mounted for rotation. The printing head carries a series of type bars 206, square in section, one of which is illustrated in Fig. 24, adapted to slide individually in suitable holes provided in head 205. Type bars 206 are normally kept in raised position by springs 207 one end of which bears on the upper side of head 205 while the other end engages pins 208 fixed to the top end of type bars 206. Pins 209 secured to the lower end of said type bars limit their upward movement. A ratchet wheel 210 is fastened to shaft 204 as at 211 and a ring 212 is mounted for free rotation on the hub of said wheel. A locking ring 213 is secured to the hub of wheel 210 by a set screw 214 and serves to prevent ring 212 from shifting out of position. Ring 212 has formed at its periphery a projecting lug 215 provided with a cam portion 216 for a purpose hereinafter to be described. A second lug 217 projecting from ring 212 carries a downwardly disposed pin 218 on which a pawl 219 is freely mounted. As clearly seen in Fig. 22, pawl 219 is located under lug 217 and is adapted to keep in engagement with the teeth of the ratchet wheel 210 by the action of a leaf spring 220.

A coil spring 221, one end of which is secured to bracket 201 at 222 and the other end secured to a pin 223 projecting from ring 212, is constantly urging said ring to move in a clockwise direction as seen in Fig. 22, while a spring presesd plunger 224, slidably mounted in a bearing 225 secured to bracket 201, served to accurately lock ratchet wheel 210 and head 205 during the printing operation. A laterally projecting member 226 secured to member 177 of rack 173 of the cutting mechanism by screws 227 has an upwardly extending portion 228 provided with a cam surface which is adapted to engage cam surface 216 in lug 215 of ring 212 during the upward movement of rack 173. The lower portion of member 226 is designed to engage and press a single type bar at a time, which happens to be in its path during its downward movement.

As explained before, tapes X and W intersect tape T at a point that is exactly in alignment with the pressed type bar and since printing tape W passes over tape T, the letter corresponding to that special type bar will be imprinted on tape T. In the present instance I use the so-called relief method of printing in which a gold printing tape is used and heated type bars are required. For this purpose a heating coil 229 connected to any source of power is provided in a hollow opening at the bottom of head 205 and is conveniently secured thereto by screws 230.

From this arrangement it will be clearly seen that when rack 173 moves down, tool 175 cuts a tab from the previously printed tape T at the same time that member 226 presses one of the type bars to print another letter on said tape. Now, when rack 173 moves up, member 228 engages lug 216 of ring 212 and forces the ring to rotate in an anti-clockwise direction, as seen in Fig. 22, a distance equal to that between centers of type bars 206. This movement is transmitted to ratchet wheel 210 through pawl 219. Plunger 224, which is forced back by said movement, will engage the next notch formed by the teeth of ratchet wheel 210, thus bringing and locking the next type bar in proper position to be operated by member 226. At the same time rod 179 engaging the end of the slot 180' in lever 180 will move this lever upwardly which will actuate the feeding mechanism for tapes W and X and feed a new portion of said tapes.

Since carriage C travels step by step over the length of tape T, feeding of said tape is necessary only once every time the carriage is returned to starting position, which happens, in this instance, after 13 tabs corresponding to the first 13 letters of the alphabet have been applied to the book. This feeding mechanism for the tape T comprises a presser foot 231 (see Figs. 22, 23 and 25) pivotally mounted on a rod 232 secured to the inner side of bracket 201. A spring 233 engaging one end 237 of the presser foot causes the other end to clamp tape T against a portion of carriage C. A lever 234 is pivotally mounted on carriage C at 235 and one of its ends 236 is constantly engaging the presser foot 231 to hold it out of engagement with the tape while the carriage is traveling. A rod 238 pivotally connected at 239 to lever 234 is guided in a bearing or bracket 240 secured to carriage C and has rigidly attached to its opposite end a collar 241. A spring 242 located between bracket 240 and collar 241 normally keeps lever 234 in engaging position with the presser foot.

As is better shown in Figs. 1 and 3, an adjustable pin 243 mounted on a bracket 244 secured to slide bar 63 is designed to engage the end of rod 238 when carriage C reaches the last step of its advance movement, which means that at the moment the carriage is released to be moved back to its starting position the abutment of rod 238 with pin 243 will move said rod backwards and lever 234 will release presser foot 231. This will allow the presser foot to grip tape T which will be drawn from the roll by carriage C as it moves back to starting position.

It will be noticed that as soon as the carriage starts its backward movement, rod 238 will be released from engagement with pin 243 and lever 234 will naturally tend to engage again presser foot 231. However, end 237 of the presser foot has moved upwardly a certain distance by the action of spring 283, consequently, end portion 236 of lever 234 will register against the side edge of the presser foot and will remain there until carriage C has returned to its starting position and the first operation for the second series of tabs corresponding to the second 13 letters of the alphabet begins. At this time and when rack 173 moves down, a downwardly depending rod 245 adjustably mounted on a laterally extending portion 246 forming part of bracket 178 will act on end portion 237 of presser foot 231 in order to release tape T. Thereafter the tip 236 of lever 234, due to the action of spring 242, will engage the top portion of presser foot end 237, thus keeping it in that position until rod 238 again engages pin 243 which happens at the end of the travel of carriage C.

The tab carrier, moistening and applying mechanism, better shown in Figs. 1 and 11 to 19, is as follows:

A bracket 247 attached to carriage C by screws 248 has at its top end a bearing portion 249 in which a shaft 250 is guided for vertical and rotatable movements. A collar 251 is secured to the lower end of shaft 250 and is provided with a groove 252 to which a ring 253 is slidably connected by screws 254. Collar 251 has a threaded stud 255 to which a vertically disposed rack 256 is secured by a nut 257. A spring pressed plunger 258 is carried by rack 256 and said plunger is adapted to engage a series of four grooves or depressions 259 formed on the periphery of the upper flange of collar 251. Rack 256 is slidably mounted on guideways provided in a housing 260 rigidly secured in any convenient way to the under side of carriage C, and said rack meshes with a gear 261, rotatably mounted, but allowed to slide on spline shaft 60. Thus, it will be seen that by this arrangement rotation of gear 261 will move rack 256 vertically and that such movement will be transmitted to shaft 250; but this shaft will be free to rotate under certain conditions. The rotating movement of shaft 250 is produced through mechanism including a gear 262 loosely mounted on shaft 250 forming part of one element of a clutch generally indicated at 263. The other element of clutch 263 is formed by a sleeve 264 having keyways adapted to engage keys 265 formed in shaft 250. A spring 266 acting on sleeve 264 keeps both elements of the clutch in mesh normally. Both elements of clutch 263 have, respectively, four teeth and notches corresponding with depressions 259 in the upper flange of collar 251.

A horizontally disposed rack 267 slidably mounted in guideways provided in housing 260 (see Figs. 11 and 13) has at one end of its sides a series of teeth 268 meshing with gear 262, while a second series of teeth 269 formed at the upper side of said rack 267 mesh with a gear 270 rotatably mounted but free to slide on spline shaft 61.

It will be seen that rotation of spline shaft 60 in either direction will rotate gear 261, which, by its connection with vertical rack 257, will produce an up or down movement of shaft 250, and rotation of spline shaft 61 in either direction will rotate gear 270, which, being in mesh with teeth 269 of horizontal rack 267 will impart to this rack a reciprocating movement. Naturally, this movement is also transmitted to gear 262 of one element of clutch 263. However, due to the shape of the teeth of the clutch and the resiliency provided by spring 266 on the other element of said clutch, it will be seen that movement of rack 267 in one direction will rotate shaft 250 in the same direction but the movement of the rack in the opposite direction will not be transmitted to shaft 250 because, due to the shape of the teeth of the clutch, these will slip over each other against the pressure of spring 266 until the tooth of clutch element 264 reaches the next notch in element 263, which happens at the end of the stroke of rack 267 in said direction.

This constitutes the mechanism for the vertical and rotating movements of shaft 250, which, as said before, is driven by spline shafts 60 and 61. The shafts 60 and 61 are operated through cam lever 43 which is pivoted to shaft 45, (see Figs. 1 and 2) and rocked in one direction by the action of cam 35 against roller 39 mounted on said lever, while a spring 48 between said lever and any convenient point of the frame of the machine will move the lever in the opposite direction. A link 271 connects the upper end of lever 43 with a crank arm 272 secured to the hub of a bevel gear 273 which is loosely mounted for rotation on shaft 56. A pinion 274 is rigidly attached to one end of spline shaft 61 and meshes with gear 273. Thus, the rocking movement of lever 43 will rotate shaft 61 first in one direction and then the other.

Similarly, another lever 44 pivoted to shaft 45 is rocked in one direction by cam 36 engaging roller 40 mounted on said lever and a spring 49 between the lever and the frame of the machine, will rock said lever in the opposite direction. A link 275 connects the upper end of lever 44 with a crank lever 276 rigidly connected to the hub of a gear 277 loosely mounted for rotation on shaft 56, and gear 277 meshes with a pinion 278 fastened to one end of spline shaft 60.

Thus, it will be seen that for each revolution of cam shaft 24, vertical shaft 250 will make one quarter of a revolution and then will be locked against rotation by spring pressed plunger 258 engaging the corresponding notch on the upper flange of collar 251 until the next revolution of cam shaft 24 forces it again to advance another quarter of a turn, and so on. But, between each quarter of a turn and through the arrangement already described, vertical shaft 250 will move vertically, first down and then up.

An octagonal head 279 (see particularly Figs. 11 to 20) is secured in any convenient way to shaft 250 and moves up or down with it. This head has on four of its sides vertically disposed guideways 280 in which slides 281, forming part of carrier arms 282, are adapted to slide. At the upper end of each slide 281 there is a vertical rod 283 extending through a hole provided in a bracket 284 which is rigidly secured to head 279. A spring 285 on rod 283 has one of its ends bearing against slide 281 while its other end bears against bracket 284.

The four carrier arms 282 are identical in construction, therefore, the description of one will be sufficient. Each arm 282 has formed at the extreme end of its lower portion a tab engaging portion 286 corresponding to the shape of a tab cut from tape T. A passage 287 (see Fig. 20) is formed in each carrier arm 282, which leads from the portion 286 to a hole 288 ending in a short tubular projection 289 at the side of each carrier arm. Flexible connections 290 are provided between the four arms 282 and the four slides 291 moving vertically in corresponding guideways 292 provided on the other four sides of the octagonal head 279, said flexible connections 290 communicating with a hole 293 passing through slides 291 (see particularly Fig. 17). Each slide 291 carries at its upper end a rod 294 projecting upwardly and passing through a hole in a bracket 295 secured to the head. A spring 296 on rod 294 and between bracket 295 and slide 291 constantly forces this slide in a downward direction. Slots 296 and 297 are provided in slide 291 and screws 298 and 299 secured to head 279 and passing through said slots serve to hold the slide in guideways 292, but permit its vertical movement.

A catch 300 is pivotally mounted on the wall of a pocket 301 formed in head 279, said pocket being deep enough for catch 300 to be out of the path of slide 291. Catch 300, however, has at one of its sides a forwardly projecting lug 302 of substantially triangular shape which is adapted to engage or disengage the bottom portion of slide 291 under certain conditions. At the other side of catch 300 a laterally extending arm 303 engages one end of a spring 304, the other end of this spring bears in a socket provided in head 279.

Head 279 is provided with four upper passages 305 (Fig. 17) radially disposed and aligned with radial holes 305' which communicate with the cylindrical cavity 306 extending axially in the upper end of shaft 250. The passages 305 extend to guideways 292 and will, at certain periods, register with holes 293 in slides 291, thus establishing connection between arms 282 and cavity 306 of shaft 250.

A second series of four radially disposed passages 307 is provided in head 279 and connect vertical passages 308 with guideways 292 as better shown in Fig. 18. The passages 307 may register, at certain times, with holes 293 in slides 291, thus establishing connection between arms 282 and passages 308.

A vertical tube 309 fixed in the carriage C (Figs. 11 and 19) communicates with a passage 310 which is connected by a flexible tube 310' with the exhaust of the pump 314 (Figs. 1 and 3). The tube 309 is arranged to connect the pump 314 with one of the vertical passages 308 in head 279 when the head moves down.

A tube 311 (Fig. 11) secured to a bracket 312 fastened to bracket 247 is connected at that point to a flexible tube 313 leading to the vacuum connection of pump 314 which is operated by motor 17 through pulley 315 on the shaft of the motor connected by a belt 316 with a pulley 317 on the shaft of the pump.

From the description, it will be seen that when the machine is in operation, a vacuum is constantly provided to passage 287 in the arms 282 when the passage 293 in the slide 291 communicates with the passage 305. On the other hand, air pressure is supplied to the passage 287 when the passage 293 in the slide 291 communicates with the passage 307.

Referring again to Figs. 11 and 19, two vertical pins 318 and 319 are secured to the top of carriage C. Pin 318 engages arm 301 of one of the catches 300, when head 279 moves down and that particular catch is at the moment in its path, which, as explained before, happens every quarter of a revolution of head 279. Consequently, if head 279 moves down and slide 291 is in the position shown at the left side of Fig. 11, pin 318 will strike arm 301 of catch 300 and rotate it clockwise against the action of the spring 304 and move lug 302 of said catch out of engagement with slide 291. Consequently, the slide 291, which is constantly pressed by spring 296, will slide down; thus, hole 293 which has been registering with passage 305 of the vacuum supply will be brought to register with air pressure passage 307, as is shown in Fig. 12.

Vertical pin 319, which is also secured to the top of carriage C is designed to engage the bottom edge of slides 291 when head 279 moves downward to bring the slides in engagement with the pin 319. Engagement of a slide 291 with the pin 319 causes the slide to move upwardly against the pressure of spring 296 until catch 300, which has been in the position shown in Fig. 12 will be moved back by spring 304 to the position at the right side of Fig. 11, thus bringing hole 293 to register again with passage 305 of the vacuum system.

A moistening pad 320 (Fig. 1) is provided in a casing 321 attached to carriage C in any convenient way and serves to moisten the dry adhesive on the tabs before they are applied to the book.

From the description and with reference to Fig. 12 particularly, it will be seen that the cycle of the carrier head is as follows:

First, and at a point or station indicated by R, cutting tool 175 and one of the arms 282 move down and engage tape T in the manner clearly shown in Fig. 26, tool 175 serving to cut the tab and the suction applied to passage 287 in arm 282 acting to pick up said tab. Then, the head 279 moves up and then turns one quarter of a revolution to point or station Q where again it moves down and the tab carried by the arm 282 engages pad 320 to moisten the tab as illustrated in Fig. 15. Then the head moves up again and turns another quarter of a revolution to point or station Y where head 279 moves down and the arm 282 applies the tab to the book. At this moment, pin 318 strikes catch 300 thus releasing slide 291, which, in the manner already described, closes communication between the vacuum system and the passage 287 and connects the air pressure passage 307 with the passage 287. Thus, the air pressure releases the tab which is applied to the book as the tab is brought in engagement with the book by the arm 282.

After this operation, the head 279 moves up again and then turns to point or station Z where head 279 moves down and then up and turns another quarter revolution to station R. At station R the head 279 moves down and pin 319 strikes slide 291 and shifts it up to its original position, thus connecting the vacuum system to the passage 287 in the arm 282.

Fig. 21 illustrates the tabs as they appear on the book after being applied, and Fig. 30 shows the manner in which the operator handles the book. This is as follows:

The operator steps on treadle 169 which raises clamp bar 93 to permit the operator to place the book between guide plates 86—88 and 89—89. The operator then releases the foot treadle which causes bar 93 to clamp the book in position as shown in Fig. 30. The operator then folds back the pages of the book to expose the page to which the tab is to be applied, which is the first page of one of the sections of the book. The tab then is applied as described. Each time a new tab is to be applied the operator steps upon the foot treadle 29. When the operator finishes applying the tabs corresponding to the first 13 letters of the alphabet, he releases the clamp bar as before, turns the book around and in the same manner starts applying the second series of tabs corresponding to the second 13 letters of the alphabet.

In the modified construction illustrated in Figs. 31, 32, 33 and 34 the supply of tape T' is carried by the carriage C' and a mechanism is provided for feeding the tape T', during each step by step movement of the carriage C', a distance to present a different portion of the tape beneath the tab cutting mechanism. For this purpose a magazine 370 for supporting the roll of tape T' is suitably mounted upon a bracket 375 which is secured by bolts 376 to the carriage C'. An L-shaped bracket 377 is secured at one end to the bracket 375 by bolts 378 and at its other end to the carriage C' by screws 379. A plate 380 is secured by screws 381 to the bracket 377 beneath the roll of tape T' and carries mechanism for feeding the tape to the cutting mechanism A'. This feeding mechanism comprises a slide 382 movable upon the top surface of the plate 380 in guideways 383 secured upon the plate 380. The tape T' is positioned upon the top surface of the slide 382 and upon the top edge of an upwardly extending projection 384 at the end of the plate 380 adjacent the cutting mechanism A'. The slide 382 is provided with a pair of spaced upwardly projecting ears 385 between which extends a shaft 386 upon which one end of a tape feeding dog 387 is pivotally mounted so that its other end may be moved into engagement with the tape to clamp the latter against the top surface of the slide 382. A block 388 is suitably secured upon the bracket 377 so as to extend upwardly past one longitudinal edge of the plate 386 and a bar 389 is secured upon the top of the block 388 as by screws 390. One end of a tape holding dog 391 is provided with a pin 392 which is rotatably mounted in a bearing provided at one end of the bar 389. The other end of the dog 391 is adapted to be moved into engagement with the tape T' and hold the latter in engagement with the top surface of the projection 384. One end of a spring 393 is fitted in a socket 394 in the other end of the bar 389 so that the other end of the spring may engage the dog 391 near its free end. The spring 393 tends to hold the dog 391 in engagement with the tape T' and hold the latter in engagement with the surface of the projection 384.

The lever 395 is pivotally mounted at an intermediate point upon a stud 396 projecting from the L-shaped bracket 377 so that one end of the lever projects between a pair of spaced rolls 397 carried upon the top of the feeding pawl 387. The other end of the lever 395 is provided with a cam follower 398 adapted to engage the cam 399 which is slidably keyed upon the splined shaft 60'. The cam 399 is provided with an annular groove 400 adapted to be engaged by a finger 401 projecting downwardly from a bracket 402 which is secured upon the carriage C' by screws 403. Lugs 405 and 406 project from the adjacent faces of the holding pawl 391 and feeding pawl 387, respectively. The lug 405 is provided with a cam surface 407 adapted to cooperate with a cam surface 408 upon one edge of the lug 406. The lug 405 is also provided with a cam surface 409 adapted to cooperate with a cam surface 410 upon the lug 406.

During each step by step movement of the carriage C' the splined shaft 60' makes one complete revolution and in so doing actuates the cam 399 so as to swing the lever 395 to cause the slide 382 to move first in the direction of the arrow shown in Fig. 33 and then in the opposite direction, the spring 374 acting to hold the cam follower 398 in engagement with the cam 399. During the movement of the slide 382 in the direction of the arrow shown in Fig. 33 the cam surface 407 on the lug 405 engages the cam surface 408 upon the lug 406 so as to cause the lug 405 to ride over the lug 406 thereby lifting the feeding dog 387 out of engagement with the tape T' and at the same time permitting the spring 393 to urge the holding dog 391 downwardly and hold the tape T' in engagement with the top surface of the projection 384. As the slide 382 nears the end of its movement in the direction of the arrow shown in Fig. 33, the lug 405 moves out of engagement with the lug 406 thereby permitting the feeding dog 387 to drop down in engagement with the tape T'. As the slide 382 is moved in the opposite direction to that shown by the arrow in Fig. 33, that is, in the direction shown by the arrow in Fig. 34, the cam surface 409 on lug 405 engages the cam surface 410 upon the lug 406 and causes the lug 406 to ride over the lug 405. When the lug 406 is riding over the lug 405 the holding pawl is moved out of engagement with the tape T' as shown in Fig. 34 and the action of spring 393 is transmitted to the holding dog 387 so as to cause the latter to clamp the tape T' against the slide 382 and cause the tape T' to move with the slide. Near the end of the movement of the slide 382 in the direction of the arrow shown in Fig. 34, the lugs 405 and 406 move out of engagement and consequently the clamping pressure upon the feeding dog 387 is released and at the same time the holding dog 391 is forced downward by the spring 393 to cause the dog 391 to hold the tape T' against the top surface of the projection 384.

I claim:

1. In a machine for placing index tabs upon the pages of a book, in combination, a pair of members one of which is movable relative to the other, one of said members being arranged for supporting a book and providing a tab applying station and the other member providing a tab receiving station, a tab carrier mounted on the other member and movable between the tab receiving station and the tab applying station, means for moving said tab carrier to each of said stations from the other, means cooperating with said carrier for picking up a tab at said receiving station and holding it on said carrier, means for rendering one surface of a tab adhesive, means cooperating with said carrier for releasing a tab therefrom at said applying station, and means operative as said carrier moves from said receiving station to said applying station for moving said movable member a distance corresponding to the distance between the desired locations on the book of adjacent tabs.

2. In a machine for placing index tabs upon the pages of a book, in combination, a pair of members one of which is movable relative to the other, one of said members being arranged for supporting a book and providing a tab applying station and the other member providing a tab receiving station, a tab carrier mounted on the other member and movable between the tab receiving station and the tab applying station, means for moving said tab carrier to each of said stations from the other, means operative when said carrier is at said receiving station to pick up and hold a tab on said carrier, means for rendering one surface of a tab adhesive, means operative as said carrier moves from said receiving station to said applying station for moving said movable member in one direction a distance corresponding to the distance in that direction between the desired locations on the book of adjacent tabs and a distance perpendicular to said direction corresponding to the distance between said adjacent tabs.

3. A machine for placing index tabs upon the edge of each of a series of pages to denote the beginning of each of a series of adjacent sections of a book comprising a pair of members one of which is movable relative to the other, one of said members being arranged for supporting a book and providing a tab applying station and the other member providing a tab cutting station, means for moving said movable member step by step distances corresponding to the distances between the desired locations of adjacent tabs, a tab carrier mounted on the other of said members and movable between the tab cutting station and the tab applying station, means for positioning in said cutting station a tape from which said tabs may be cut, means at said cutting station for cutting a tab from said tape, means for rendering one surface of a tab adhesive, means operative during each step by step movement of said movable member for moving said tab carrier to each of said stations from the other, means cooperating with said carrier at said cutting station to pick up a tab severed from said tape and hold the tab on said carrier, and means operative as said carrier moves into said applying station to release a tab.

4. A machine for placing index tabs upon the edge of each of a series of pages to denote the commencement of each of a series of adjacent sections of a book comprising a pair of members one of which is movable relative to the other, one of said members being arranged for supporting a book and providing a tab applying station and the other member providing a tab cutting station, means for moving said movable member step by step distances corresponding to the distances between the desired locations of adjacent tabs, a tab carrier mounted on the other of said members and movable between and into the tab cutting station and the tab applying station, means for supporting a supply of tape from which tabs may be cut, feeding means operative during each step by step movement of said movable member to feed said tape to present an uncut area thereof in said cutting station, means at said cutting station for cutting a tab from said tape, means for rendering one surface of a tab adhesive, means operative during each step by step movement of said movable member for moving said tab carrier to positions opposite each of said stations and into and out of the same, means operative when said carrier is at said cutting station to pick up a tab severed from said tape, and means operative as said carrier moves into said applying station to release a tab.

5. A machine for placing index tabs upon the edge of each of a series of pages to denote the commencement of each of a series of adjacent sections of a book comprising a pair of members one of which is movable relative to the other, one of said members being arranged for supporting a book and providing a tab applying station and the other member providing a tab cutting station, means for moving said movable member step by step distances corresponding to the distances between the desired locations of adjacent tabs, a tab carrier mounted on the other of said members and movable between and into the tab cutting station and the tab applying station, means for supporting a supply of tape from which tabs may be cut, feeding means operative during each step by step movement of said movable member to feed said tape to present an uncut area thereof in said cutting station, means at said cutting station for cutting a tab from said tape, means for rendering one surface of a tab adhesive, means operative during each step by step movement of said movable member for moving said tab carrier to positions opposite each of said stations and into and out of the same, means operative when said carrier is at said cutting station to pick up a tab severed from said tape, means operative as said carrier moves into said applying station to release a tab, printing mechanism including a ribbon, means operative during each step by step movement of said movable member to feed said ribbon to present a different area thereof adjacent a surface of an uncut area of said tape and actuate said printing mechanism to form a character upon said tape.

6. A machine for placing a series of index tabs upon the edge of each of a series of pages to denote the commencement of each of a series of adjacent sections of a book so that the adjacent tabs are positioned different distances from the top edge of the book comprising a pair of members one of which is movable relative to the other, one of said members being arranged for supporting a book and providing a tab applying station and the other member providing a tab cutting station, means for moving said movable member step by step in one direction corresponding to the distance in that direction between the desired locations of adjacent tabs and distances perpendicular to said direction corresponding to the thickness of said adjacent sections, a tab carrier mounted on the other of said members and movable between and into the tab cutting station and the tab applying station, means for positioning in said cutting station a tape from which said tabs may be cut, means at said cutting station for cutting a tab from said tape, means for rendering one surface of a tab adhesive, means operative during each step by step movement of said movable member for moving said tab carrier to positions opposite each of said stations and into and out of the same, means operative when said carrier is at said cutting station to pick up a tab severed from said tape, and means operative as said carrier moves into said applying station to release a tab.

7. A machine for placing a series of index tabs upon the edge of each of a series of pages to denote the commencement of each of a series of adjacent sections of a book so that the adjacent tabs are positioned different distances from the top edge of the book comprising an inclined support, a pair of members one of which is movable upon said support relative to the other, one of said members being arranged for supporting a book and providing a tab applying station and the other member providing a tab cutting station, means for moving said movable member step by step distances corresponding to the desired distances between adjacent tabs, a tab carrier movable between and into the tab cutting station and the applying station, means for positioning in said cutting station a tape from which said tabs may be cut, means at said cutting station for cutting a tab from said tape, means for rendering one surface of a tab adhesive, means operative during each step by step movement of said movable member for moving said tab carrier to positions opposite each of said stations and into and out of the same, means operative when said carrier is at said cutting station to pick up a tab severed from said tape, and means operative as said carrier moves into said applying station to release a tab.

8. A machine for placing index tabs upon the edge of each of a series of pages to denote the commencement of each of a series of adjacent sections of a book comprising a pair of members one of which is movable relative to the other, one of said members being arranged for supporting a book and providing a tab applying station and the other member providing a tab cutting station, means for moving said movable member step by step distances corresponding to the distances between the desired locations of adjacent tabs, a tab carrier carried by the other of said members and movable between and into the tab cutting station and the tab applying station, means for supporting a supply of tape from which tabs may be cut, feeding means operative during each step by step movement of said movable member to feed said tape to present an uncut area thereof in said cutting station, means at said cutting station for cutting a tab from said tape, means for rendering one surface of a tab adhesive, means operative during each step by step movement of said movable member for moving said tab carrier to positions opposite each of said stations and into and out of the same, means operative when said carrier is at said cutting station to pick up a tab severed from said tape, and means operative as said carrier moves into said applying station to release a tab.

9. A machine for placing a series of index tabs upon the edge of each of a series of pages to denote the commencement of each of a series of adjacent sections of a book so that the adjacent tabs are positioned different distances from the top edge of the book and providing a tab applying station comprising a table for supporting the book, a support inclined with respect to said table, a carriage carried by said support for movement adjacent the edge of the table and providing a cutting station, means for moving said carriage step by step distances corresponding to the desired distances between adjacent tabs, a tab carrier movable on said carriage between and into the tab cutting station and the applying station, means for positioning in said cutting station a tape from which said tabs may be cut, means at said cutting station for cutting a tab from said tape, means for rendering one surface of a tab adhesive, means operative during each step by step movement of said carriage for moving said tab carrier to positions opposite each of said stations and into and out of the same, means operative when said carrier is at said cutting station to pick up a tab severed from said tape, and means operative as said carrier moves into said applying station to release a tab.

HJALMAR ERICKSON.